UNITED STATES PATENT OFFICE.

JOHN L. STERLING, OF PITTSBURGH, PENNSYLVANIA, ASSIGNOR TO STERLING SALT BRICK COMPANY, OF PITTSBURGH, PENNSYLVANIA, A CORPORATION OF PENNSYLVANIA.

SALT BRICK AND METHOD OF MAKING SAME.

1,244,141.  Specification of Letters Patent.  Patented Oct. 23, 1917.

No Drawing.  Application filed January 22, 1917.  Serial No. 143,809.

*To all whom it may concern:*

Be it known that I, JOHN L. STERLING, a resident of Pittsburgh, in the county of Allegheny and State of Pennsylvania, have invented a new and useful Improvement in Salt Bricks and Methods of Making Same, of which the following is a specification.

This invention relates to so-called salt bricks for consumption by domestic animals, and to the method of making the same.

The object of the invention is to provide a salt brick having medicinal and conditioning properties, and which is economical to make and also economical to use in that it is solid and firm and does not easily break and does not disintegrate with moisture, and is such that domestic animals are not likely to eat too much thereof.

The principal ingredient of the salt brick is natural table salt, to which is added relaively small quantities of the following medicinal and conditioning ingredients:

Fenugreek seed

Powdered root of yellow dock or German burdock

Powdered elecampane root

Quassia chips or powdered gentian root.

In order to form a binder and also enable the brick to better withstand moisture, linseed oil is added to the other ingredients. If a further binder is necessary, a small quantity of glue, preferably what is known as white beef glue, may be added, but this is not an essential.

The following proportions of the ingredients are preferred:

To 300 lbs. natural table salt add 10 to 12 lbs. fenugreek seed, 3 to 4 lbs. powdered root of yellow dock or German burdock, 3 to 4 lbs. powdered elecampane root, 3 to 4 lbs. of quassia chips or powdered gentian root, 1 gal. linseed oil, and 5 to 6 lbs. of white beef glue, when the latter is used.

In making up the brick, the linseed oil, together with glue, if the latter is used, is heated in a kettle until it comes to a boil. It is then preferably permitted to cool for 10 or 15 minutes. The medicinal and conditioning ingredients together with the salt are thoroughly mixed in a suitable mixing apparatus and then the linseed oil, after heating as above described, is poured into the mixture and the mass is thoroughly mixed for 25 to 30 minutes, while being maintained at a temperature from 70 to 150 degrees Fahrenheit. This can conveniently be done by admitting steam into the mixer, thereby heating the mixture and also keeping it in moist condition, suitable for molding. After being thoroughly mixed at the temperature specified, the mass is discharged from the mixer in moist condition and goes to a molding and pressing apparatus wherein it is molded into bricks of the desired size and shaped under heavy pressure,—about 1200 pounds per square inch. These are then taken to a drying chamber and are there exposed to a temperature from 120 to 150 degrees Fahrenheit for a period of from 36 hours to 3 days, until they become absolutely dry, and are then ready for use.

Bricks made according to the above process are perfectly smooth and are very firm and solid, so that they can be handled without danger of breakage or chipping, and also have the property of not disintegrating under the ordinary damp conditions to which they are exposed in use. Because of their firm solid texture, these bricks are very economical, as the animals can only wear them away slowly by licking on them, so that no portion of the brick is liable to become wasted because of disintegrating or breaking into pieces, and furthermore, since the animals can only consume the same slowly, as by licking, they are not liable to over eat or take too much of the salt. The result is that brick of this firm, dense, smooth texture are not only more economical, but are much better for the animals than brick as heretofore made, for the reason that the animals will only take the necessary quantity of salt.

What I claim is:

1. The method of making salt brick consisting in mixing salt and other ingredients with slightly boiled linseed oil, and then molding the same under pressure.

2. The method of making salt brick consisting in adding to salt slightly boiled linseed oil, mixing the same while maintaining the same in a warm moist condition, and then molding the same under pressure.

3. The method of making salt brick consisting in adding to salt and medicinal ingredients slightly boiled linseed oil, mixing the same by the admission of steam thereto, molding the same under pressure, and then thoroughly drying the same.

4. A salt brick comprising a dense, solid, smooth body comprising salt, medicinal and conditioning ingredients, and linseed oil as a binder.

In testimony whereof, I have hereunto set my hand.

JOHN L. STERLING.

Witness:
GLENN H. LERESCHE.

Copies of this patent may be obtained for five cents each, by addressing the "Commissioner of Patents, Washington, D. C."